Sept. 10, 1940.    C. E. BASTON ET AL    2,214,571
ELECTRIC SUPPLY SYSTEM
Filed Aug. 6, 1937
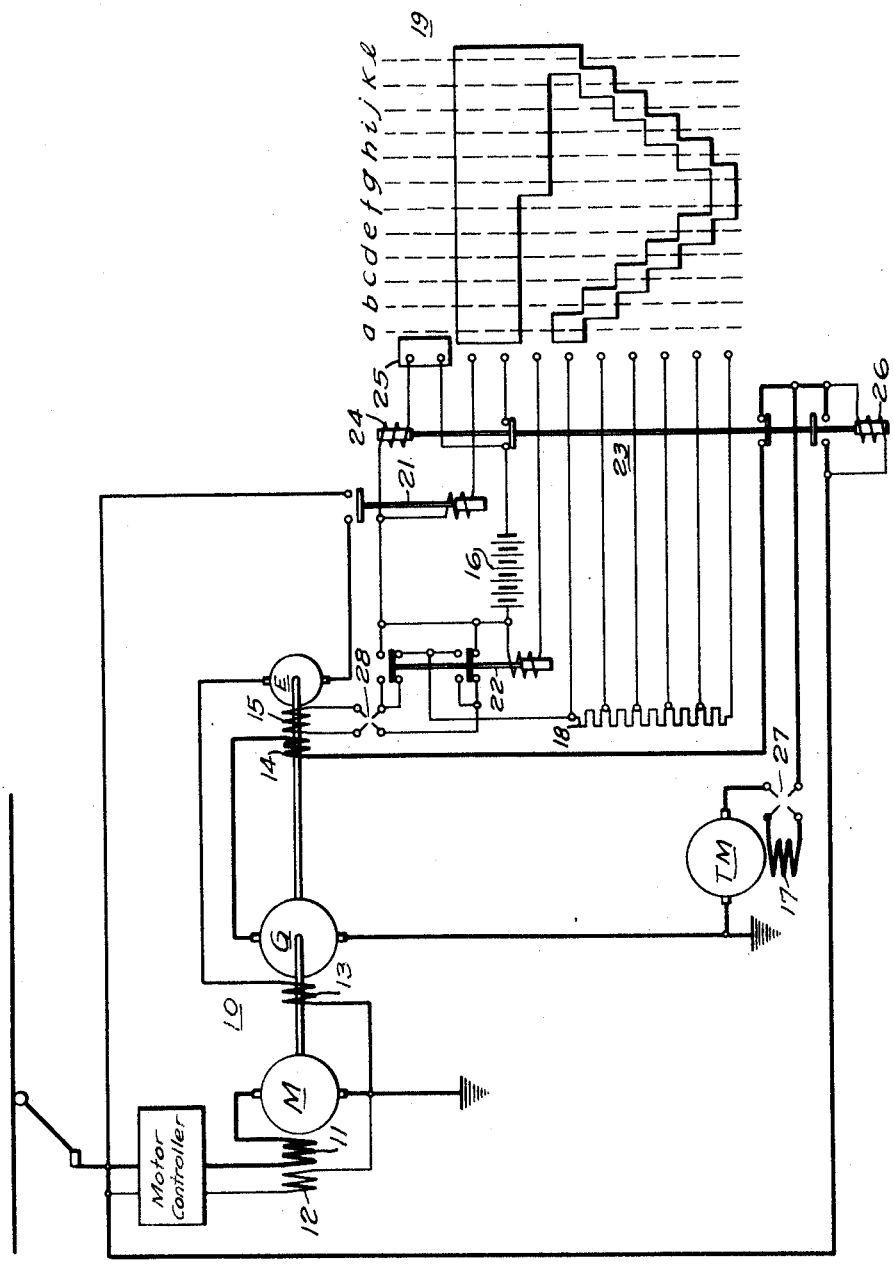
WITNESSES:
INVENTORS
Cyril E. Baston and
Eric A. Binney.
BY
ATTORNEY Patented Sept. 10, 1940

2,214,571

UNITED STATES PATENT OFFICE 2,214,571

ELECTRIC SUPPLY SYSTEM

Cyril E. Baston, Forest Hills, Pa., and Eric Alton Binney, Ilkley, England, assignors to The English Electric Company Limited, London, England, a British company Application August 6, 1937, Serial No. 157,655
In Great Britain August 17, 1936

5 Claims. (Cl. 172—239)

This invention relates, generally, to electric supply systems and, more particularly, to a motor-generator set or like rotary electric converting plant associated with a direct-current motor—as in the Ward-Leonard system—so as to vary and control the motor speed by varying and controlling the potential difference applied to its armature.

One object of the invention is to provide for automatically accelerating an electric traction motor.

Another object of the invention is to provide for decelerating an electric traction motor by means of regenerative braking.

The invention provides a combination in which the generator will build up voltage automatically and accelerate the working motor automatically at a substantially constant predetermined current. To this end the generator is excited by means which, firstly, have a decompounding effect and reduce its excitation as the load current increases and which, secondly, act in response to an increase in power output of the generator to increase its excitation. Thus an exciter for the generator may have its own excitation dependent upon the generator load current and its speed dependent on the generator power output. For determining various values at which the generator current is to be automatically maintained the exciter may have an adjustable regulating winding.

For a fuller understanding of the nature and objects of the invention, reference may be had to the following detailed description, taken in conjunction with the accompanying drawing, in which the single figure is a diagrammatic view of an electric power system embodying the invention.

In the illustrated form of the invention as applied to a Ward-Leonard equipment drawing energy from direct current mains and supplying and controlling a direct current traction motor TM, the motor-generator set 10 comprises three machines mounted on a single shaft, viz: the driving motor M, a cumulative compound wound direct current machine having a series field winding 11 and a shunt field winding 12; the main generator G, a separately excited direct current machine having a field winding 13; and an exciter E, a direct current machine having a main field winding 14 carrying all or a proportionate part of the output current of the main generator G and an auxiliary field winding 15 which is separately excited from a battery 16.

The driving motor M draws energy from the direct current supply and runs at a definite no-load speed, but will slow down as load is applied, due to the increase in its excitation set up by the series winding 11 as well as due to resistance drop. The generator field winding 13 is fed from the direct current supply but is connected in series with the armature of the exciter E which normally acts in opposition to the supply; thus an increase in exciter voltage decreases the generator excitation, and vice versa. The armatures of the generator G and the working or traction motor TM are connected in a closed circuit which includes the motor series field winding 17 and the main field winding 14 of the exciter, with or without a diverting resistance for the latter.

With the generator on open circuit the exciter electromotive force and hence the generator electromotive force are determined by the strength of the auxiliary field winding 15 of the exciter which also determines the substantially constant current which is to be maintained. A regulator comprising a resistor 18 and a drum controller 19 in this auxiliary and separately excited field circuit enables the driver or operator to determine the desired accelerating current of the motor.

In operation, with the motor-generator set rotating at its no load speed, the regulating winding 15 of the exciter E is energized so as to generate, for example, approximately half the supply voltage in a direction opposite to that of the supply. When the traction motor is to be started up, the circuit from the supply through the exciter armature and the generator field 13 is closed by operating the controller 19 to close a contactor 21 and current flows from the line through the exciter armature and the generator field winding 13. The voltage generated by the generator G when so excited causes current to flow through the exciter main field winding 14 to the traction motor TM and back to the generator. This increases the counter electromotive force of the exciter and, hence, decreases the current through the exciter armature and generator field 13 thereby reducing the generator excitation and reducing the armature current. Since a reduction in armature current tends to decrease the counter electromotive force of the exciter and to increase the excitation and the generated electromotive force of the generator, equilibrium will be reached at a certain definite current.

Due to the motor torque resulting from this current the traction motor starts to rotate and to build up a back electromotive force. The first tendency of this will be to reduce considerably the current flowing through the armatures in proportion to the back electromotive force. However, due to the decompounding action of the exciter, any reduction in generator armature current causes an increase in the excitation and electromotive force of the generator which tends to compensate for the back electromotive force of the traction motor. With the exciter running at constant speed the result would be that while the armature current still decreases substantially proportionally to the back electromotive force the actual reduction for a given back electromotive force is much less as a result of the decompounding. But the motor driving the generator and exciter is cumulatively compounded specifically in order to cause a drop in speed of the set with the increased load; hence the increased load on the generator due to its increased voltage causes a decrease in speed, which, by decreasing the exciter counter-electromotive force still further, brings about a further increase in the excitation and the electromotive force of the generator.

The design of the exciter is such that at this new and low speed, substantially the original field excitation thereof is required to enable the exciter to regulate the generator field current to the new value such that the generator electromotive force will be high enough to compensate for the back electromotive force of the motor and maintain the original current. Thus, the current is kept practically constant. As the motor accelerates, the action described above will continue until full voltage of the generator is reached; thereafter the generator voltage will automatically fall off due to the saturation of the generator field and the effect of armature reaction of the exciter. This falling off is very desirable in that there is an inherent tendency to maintain constant current, giving constant torque up to the limit of capacity of the motor-generator set and then for the torque to fall off as the speed of the traction motor increases, thus giving a constant horse-power output during steady running, which is the ultimate aim of any automatic equipment.

The action of the exciter regulating winding 15 is best explained by assuming that the traction motor has been run up to speed at constant current and that during the period under discussion the generator voltage does not change due to change in speed of the motor but only due to the increase in current. The total excitation of the exciter is the sum of that supplied by its series winding 14 and the regulating winding 15. If the current in the latter be decreased by operating the controller 19 to insert more of the resistor 18 in series with the winding 15, the exciter electromotive force will decrease and the generator field current and electromotive force will accordingly increase; this will bring about an increase of generator current which is however checked partly by the accompanying increase in the main excitation of the exciter and partly by a reduction in speed of the set, equilibrium being reached at a higher current value. Any resulting motor acceleration is then at the new and higher constant current.

This decrease in the auxiliary excitation of the exciter can be carried to practically zero at which time all of the excitation of the exciter will be derived from the series winding. The current in the regulating winding may then be reversed by actuating the controller 19 to position $g$ to operate a reversing contactor 22, and still more current would be required in the series winding to maintain the exciter field strength. The generator current may be increased further by actuating the controller 19 toward position $l$ to shunt the resistor 18 from the circuit for the regulating field winding 15.

It might be pointed out that in an ordinary motor-generator set the difference between the power utilized in the field circuit and that taken from the source of supply is usually dissipated in heat. In the above system this power is utilized in helping to drive the set since the current flowing through the exciter armature is opposite in direction to the electromotive force generated in the exciter armature and the torque produced as a result is a motoring torque.

The primary feature of a set as described, if it is to maintain a constant current, is the matching of the speed-load characteristic of the motor driving the motor-generator set, the current-speed characteristic of the exciter and the speed-voltage-excitation characteristics of the main generator. For instance if, at a given load, the set runs at a certain speed then the current in the field of the generator to give that load must equal the current taken from the supply by the exciter when its own excitation is made up of that due to the generator current corresponding to the given load combined with that due to the regulator winding, and when its speed is that at which the set is running.

To reduce the size of the motor-generator set very materially the traction motor TM may be automatically connected directly to the supply by a contactor 23 when the voltage applied to the motor has reached line voltage; the motor-generator set then being disconnected. The contactor 23 is provided with an actuating coil 24, which is energized from the battery 16 through a segment 25 on the controller 19, and a holding coil 26, one terminal of which is connected to line potential while the potential applied to the traction motor is also applied to the other terminal of the coil 26. Thus, when the potential applied to the motor is equal to line potential, no current flows through the holding coil 26 and the contactor 23 drops to its lowermost position to connect the motor to the supply and disconnect it from the generator G. Since, with such an arrangement the motor generator set is in circuit only during acceleration of the traction motor, its component machines can be rated on a short time basis, thereby resulting in a considerable saving in weight and cost.

A series-wound traction motor may be regeneratively braked by reversing the field connections, so that it becomes a series generator. Such a generator when feeding back into a constant voltage system is unstable, tending to increase in voltage and current without limit. However, a series motor when operating as a generator and feeding only the generator (then operating as a motor) of a motor-generator set according to our invention may be made stable providing that an increase in current generated by the traction motor results in such a weakening or reversal of the excitation of the exciter that any increase in counter electromotive force in the generator is greater than the increase in generated voltage of the traction motor. It is a feature of the invention to design the characteristics of the exciter such as to bring this about.

It is to be noted that during regeneration the current in the main field winding 14 of the exciter E is reversed. As the excitation of the generator G must be greatest when operating at high speed and decrease automatically as the speed decreases, it is necessary that any current supplied to the line during regeneration should also have these characteristics. When the machine which normally acts as the driving motor of the set is regenerating the current in its series field winding reverses. Since power is then being delivered to the line by a differentially compounded generator, its speed will vary with load, being high when the power is high and decreasing to the no-load speed as the power delivered to the set from the traction motor decreases to zero. With the field connections of the traction motor and the exciter field winding 15 reversed by means of reversing switches 27 and 28, respectively, and hence with the generator and the exciter series fields carrying currents in the reverse direction the set will operate to maintain constant current in the traction motor when regenerating as well as when motoring.

On a change in the supply voltage the speed of the motor-generator set will also vary and hence after a short interval the current will settle down to a value approximating its original value. During the transition period the current will increase momentarily on a drop in supply voltage or decrease momentarily on an increase in supply voltage during motoring; the opposite will occur during regeneration.

On a failure or temporary interruption of the supply when the traction motor is running, the momentum of the motor-generator set will tend to keep it running and supplying the traction motor which will however retard but at substantially constant current, until the speed drops to some very low value. If the supply is quickly restored the motor will be accelerated again at constant current.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a power system, in combination, a traction motor, a generator for supplying current to said motor, an exciter for said generator, a motor for driving said generator and said exciter, and a source of power for said driving motor, said driving motor having a shunt field winding and a series field winding compounded cumulatively, said generator having a field winding connected across said power source in series-circuit relation with the armature of said exciter, said exciter having a main field winding energized in accordance with the armature current of said generator and a regulating winding energized from a source of substantially constant potential, the voltage of said exciter opposing the voltage of said power source.

2. In a power system, in combination, a traction motor, a generator for supplying current to said motor, an exciter for said generator, a motor for driving said generator and said exciter, and a source of power for said driving motor, said driving motor having a shunt field winding and a series field winding compounded cumulatively, said generator having a field winding so connected across said power source in series-circuit relation with the armature of said exciter that the voltage of said exciter opposes the voltage of said power source, said exciter having a main field winding energized in accordance with the armature current of said generator and a regulating winding energized from a source of substantially constant potential, and means for varying the current in said regulating winding, thereby controlling the generator current supplied to said traction motor.

3. In a power system, in combination, a traction motor, a generator for supplying current to said motor, an exciter for said generator, a motor for driving said generator and said exciter, and a source of power for said driving motor, said driving motor having a shunt field winding and a series field winding compounded cumulatively, said generator having a field winding so connected across said power source in series-circuit relation with the armature of said exciter that the voltage of said exciter opposes the voltage of said power source, said exciter having a main field winding energized in accordance with the armature current of said generator and a regulating winding energized from a source of substantially constant potential, means for varying the current in said regulating winding, thereby controlling the generator current supplied to said traction motor, and means for reversing the current in said regulating winding to increase the range of operation over which said generator current may be controlled.

4. In a power system, in combination, a traction motor, a generator for supplying current to said motor, an exciter for said generator, a motor for driving said generator and said exciter, and a source of power for said driving motor, said driving motor having a shunt field winding and a series field winding compounded cumulatively, said generator having a field winding connected in series-circuit relation with the armature of said exciter, said exciter having a main field winding energized in accordance with the armature current of said generator and a regulating winding energized from a source of substantially constant potential, means for varying the current in said regulating winding, thereby controlling the generator current supplied to said traction motor, and means for connecting said traction motor to said power source when the generated voltage applied to said motor is substantially equal to the voltage of said power source.

5. In a power system, in combination, a traction motor having a series field winding, a generator for supplying current to said motor, an exciter for said generator, a motor for driving said generator and said exciter, and a source of power for said driving motor, said driving motor having a shunt field winding and a series field winding compounded cumulatively, said generator having a field winding connected in series-circuit relation with the armature of said exciter, said exciter having a main field winding energized in accordance with the armature current of said generator and a regulating winding energized from a source of substantially constant potential, means for varying the current in said regulating winding, thereby controlling the generator current supplied to said traction motor, and means for reversing the connections to the series field winding of the traction motor and the regulating winding of the exciter to permit regenerative braking of the traction motor.

CYRIL E. BASTON.
ERIC ALTON BINNEY.